United States Patent
Li

(10) Patent No.: US 12,160,114 B2
(45) Date of Patent: Dec. 3, 2024

(54) TERMINAL AND WIRELESS CHARGING CONTROL METHOD

(71) Applicant: VIVO MOBILE COMMUNICATION CO., LTD., Guangdong (CN)

(72) Inventor: Jiaxin Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 601 days.

(21) Appl. No.: 17/459,684

(22) Filed: Aug. 27, 2021

(65) Prior Publication Data

US 2021/0391753 A1 Dec. 16, 2021

Related U.S. Application Data

(63) Continuation of application No. PCT/CN2020/075726, filed on Feb. 18, 2020.

(30) Foreign Application Priority Data

Feb. 28, 2019 (CN) .......................... 201910152135.2

(51) Int. Cl.
- *H02J 50/10* (2016.01)
- *H02J 7/00* (2006.01)
- *H02J 7/02* (2016.01)

(52) U.S. Cl.
CPC ............ *H02J 50/10* (2016.02); *H02J 7/0042* (2013.01); *H02J 7/02* (2013.01)

(58) Field of Classification Search
CPC .. H02J 50/10; H02J 7/0042; H02J 7/02; H02J 2207/40
See application file for complete search history.

(56) References Cited

U.S. PATENT DOCUMENTS

| 9,728,989 B2 * | 8/2017 | Kim .......................... H02J 7/02 |
| 2013/0113421 A1 | 5/2013 | Han et al. |

(Continued)

FOREIGN PATENT DOCUMENTS

| CN | 201654673 U | 11/2010 |
| CN | 102665052 A | 9/2012 |

(Continued)

OTHER PUBLICATIONS

Espacenet translation of CN 109240034 A, Chen et al., Espacenet, pp. 1-9. 2019 (Year: 2019).*

(Continued)

*Primary Examiner* — Stacy Whitmore

(74) *Attorney, Agent, or Firm* — IP & T GROUP LLP

(57) ABSTRACT

A terminal, includes: a coil disposed inside the terminal; a wireless charging module that is electrically connected to the coil, and includes a wireless charging transmitting circuit and a wireless charging receiving circuit that are electrically connected to the coil; a detection module electrically connected to the wireless charging module and a wired charging port of the terminal. When detecting that electric energy input to the wired charging port, the detection module sends a first electrical signal to the wireless charging module, and the wireless charging module initiates the wireless charging transmitting circuit based on the first electrical signal; when detecting that no electric energy is input to the wired charging port, the detection module sends a second electrical signal to the wireless charging module, and the wireless charging module initiates the wireless charging receiving circuit based on the second electrical signal.

9 Claims, 6 Drawing Sheets

(56) References Cited

U.S. PATENT DOCUMENTS

| | | | |
|---|---|---|---|
| 2014/0009120 A1* | 1/2014 | Kim | H02J 7/0068 |
| | | | 320/138 |
| 2014/0225558 A1 | 8/2014 | Park | |
| 2016/0006484 A1 | 1/2016 | Swaans et al. | |
| 2016/0077562 A1 | 3/2016 | Smith | |
| 2016/0301238 A1* | 10/2016 | Khoshvenis | H02J 7/0049 |
| 2017/0012446 A1 | 1/2017 | Lim et al. | |
| 2017/0346340 A1* | 11/2017 | Vitali | H02J 7/342 |

FOREIGN PATENT DOCUMENTS

| | | |
|---|---|---|
| CN | 102738869 A | 10/2012 |
| CN | 102984312 A | 3/2013 |
| CN | 203119516 U | 8/2013 |
| CN | 105098848 A | 11/2015 |
| CN | 106469928 A | 3/2017 |
| CN | 107707000 A | 2/2018 |
| CN | 108011411 A | 5/2018 |
| CN | 207994690 U | 10/2018 |
| CN | 108964217 A | 12/2018 |
| CN | 109120034 A | 1/2019 |
| CN | 208479231 U | 2/2019 |
| CN | 109888928 A | 6/2019 |
| EP | 2560356 A2 | 2/2013 |
| JP | 2013-178326 A | 9/2013 |

OTHER PUBLICATIONS

International Search Report of International Application No. PCT/CN2020/075726 mailed on May 19, 2020.

Written Opinion of The International Searching Authority of International Application No. PCT/CN2020/075726 mailed on May 19, 2020.

First Office Action of Priority Application No. CN 201910152135.2 mailed on May 20, 2020.

The Second Office Action of Priority Application No. CN 201910152135.2 mailed on Jan. 13, 2021.

Notification to Grant Patent Right for Invention of Priority Application No. CN 201910152135.2 mailed on May 19, 2021.

Extended European Search Report issued by the European Patent Office on Mar. 3, 2022.

* cited by examiner

TERMINAL AND WIRELESS CHARGING CONTROL METHOD

CROSS-REFERENCE TO RELATED APPLICATIONS

This application is a Bypass Continuation Application of PCT/CN2020/075726 filed on Feb. 18, 2020, which claims priority to Chinese Patent Application No. 201910152135.2 filed on Feb. 28, 2019, which are incorporated herein by reference in their entirety.

TECHNICAL FIELD

Embodiments of the present disclosure relate to the field of communications technologies, and in particular, to a terminal and a wireless charging control method.

BACKGROUND

With the development of terminal charging technologies, wireless charging technologies appear to meet people's requirements for convenient charging, and are increasingly popularized. Wireless charging means that a charger of a terminal device that needs to be charged is not connected to a charging power cable in a related technology, but electric energy is transmitted by using an alternating magnetic field generated between coils. To implement wireless charging, a wireless transmit terminal is generally disposed in a wireless charger, and a wireless receive end is disposed in a charged terminal device (such as a mobile phone), to receive electric energy. In the related technology, the wireless charger can only charge another terminal device wirelessly, but cannot be wirelessly charged by another terminal device. However, the charged terminal device can only be wirelessly charged by the wireless charger, but cannot wirelessly charge another terminal device. This is still inconvenient for the user to use wireless charging.

SUMMARY

According to a first aspect, a terminal is provided, and includes:
  a coil disposed inside the terminal;
  a wireless charging module electrically connected to the coil, where the wireless charging module includes a wireless charging transmitting circuit and a wireless charging receiving circuit that are electrically connected to the coil; and
  a detection module that is electrically connected to the wireless charging module and a wired charging port of the terminal; where
  when detecting that electric energy is input to the wired charging port, the detection module sends a first electrical signal to the wireless charging module, and the wireless charging module initiates the wireless charging transmitting circuit based on the first electrical signal; and when detecting that no electric energy is input to the wired charging port, the detection module sends a second electrical signal to the wireless charging module, and the wireless charging module initiates the wireless charging receiving circuit based on the second electrical signal.

According to a second aspect, a wireless charging control method is provided, where the method is applied to the foregoing terminal, and the method includes:

detecting whether electric energy is input to the wired charging port;
initiating the wireless charging transmitting circuit when it is detected that electric energy is input to the wired charging port; and
initiating the wireless charging receiving circuit when it is detected that no electric energy is input to the wired charging port.

According to a third aspect, a terminal is provided, where the terminal is the foregoing terminal, and the terminal further includes:
  a port detection module, configured to detect whether electric energy is input to the wired charging port;
  a first control module, configured to initiate the wireless charging transmitting circuit when the port detection module detects that electric energy is input to the wired charging port; and
  a second control module, configured to initiate the wireless charging receiving circuit when the port detection module detects that no electric energy is input to the wired charging port.

BRIEF DESCRIPTION OF DRAWINGS

To describe the technical solutions of the embodiments of the present disclosure more clearly, the following briefly describes the accompanying drawings required for describing the embodiments. Apparently, the accompanying drawings in the following descriptions show merely some embodiments of the present disclosure, and a person of ordinary skill in the art may still derive other drawings from these accompanying drawings.

DESCRIPTION OF EMBODIMENTS

Exemplary embodiments of the present disclosure are described in more detail below with reference to the accompanying drawings. Although the exemplary embodiments of the present disclosure are shown in the accompanying drawings, it should be understood that the present disclosure may be implemented in various forms without being limited to the embodiments described herein. Instead, these embodiments are provided to provide a more thorough understanding of the present disclosure and to convey the scope of the present disclosure to those skilled in the art.

According to an aspect of the embodiments of the present disclosure, a terminal is provided. The terminal is an electronic device with a battery, such as a mobile phone, a mobile power supply, a tablet computer, a laptop computer, a palmtop computer, an in-vehicle terminal, a wearable device, or a pedometer.

Figure 1:
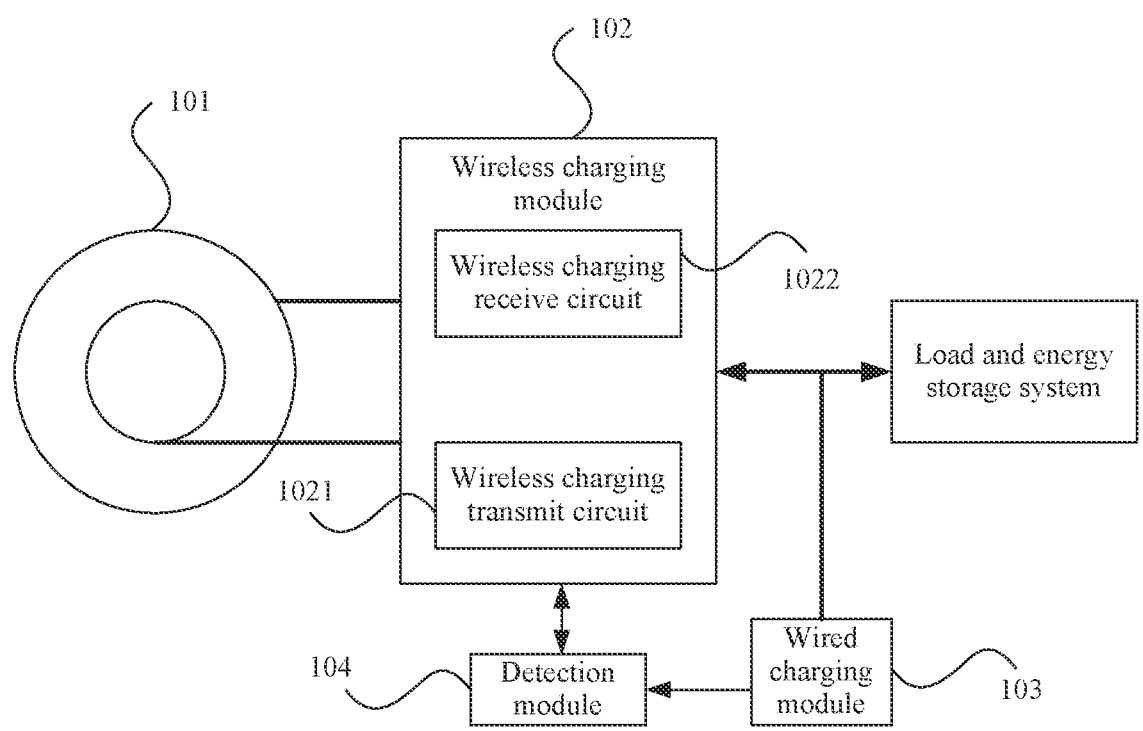
FIG. 1 is a schematic structural diagram 1 of a terminal according to an embodiment of the present disclosure.

As shown in FIG. 1, the terminal includes a coil 101, a wireless charging module 102, a wired charging port 103, and a detection module 104.

The coil 101 is disposed inside the terminal, and is mainly configured to generate an alternating magnetic field when being used for wireless charging. The wireless charging herein includes: one terminal wirelessly charges another terminal device, and the terminal is wirelessly charged by another terminal device.

The wireless charging module 102 is electrically connected to the coil 101. For example, the wireless charging module 102 includes a wireless charging transmitting circuit 1021 and a wireless charging receiving circuit 1022 that are electrically connected to the coil 101. The wireless charging transmitting circuit 1021 has a function of outputting electric energy wirelessly, in other words, the terminal can wirelessly charge another terminal device. The wireless charging receiving circuit 1022 has a function of inputting electric energy wirelessly, in other words, the terminal can be wirelessly charged by another terminal.

The detection module 104 is electrically connected to the wireless charging module 102 and the wired charging port 103.

Obviously, the wired charging port 103 is a port configured to connect to an entity charging circuit. In this embodiment of the present disclosure, the detection module 104 is mainly configured to detect whether electric energy is input to the wired charging port 103, in other words, detect whether there is a wired charging device (for example, a wired charger or a wired adaptor) that charges the terminal. If electric energy is input to the wired charging port 103, it indicates that there is a wired charging device that charges the terminal. If no electric energy is input to the wired charging port 103, it indicates that there is no wired charging device that charges the terminal. For example, this may be determined by detecting a parameter such as a current or a voltage of the wired charging port 103.

In this embodiment of the present disclosure, when the detection module 104 detects that electric energy is input to the wired charging port 103, the wireless charging transmitting circuit 1021 is initiated, so that the terminal is in a state of being capable of wirelessly charging another terminal device; and when the detection module 104 detects that no electric energy is input to the wired charging port 103, the wireless charging receiving circuit 1022 is initiated, so that the terminal is in a state of being capable of being wirelessly charged by another terminal device.

Figure 2:
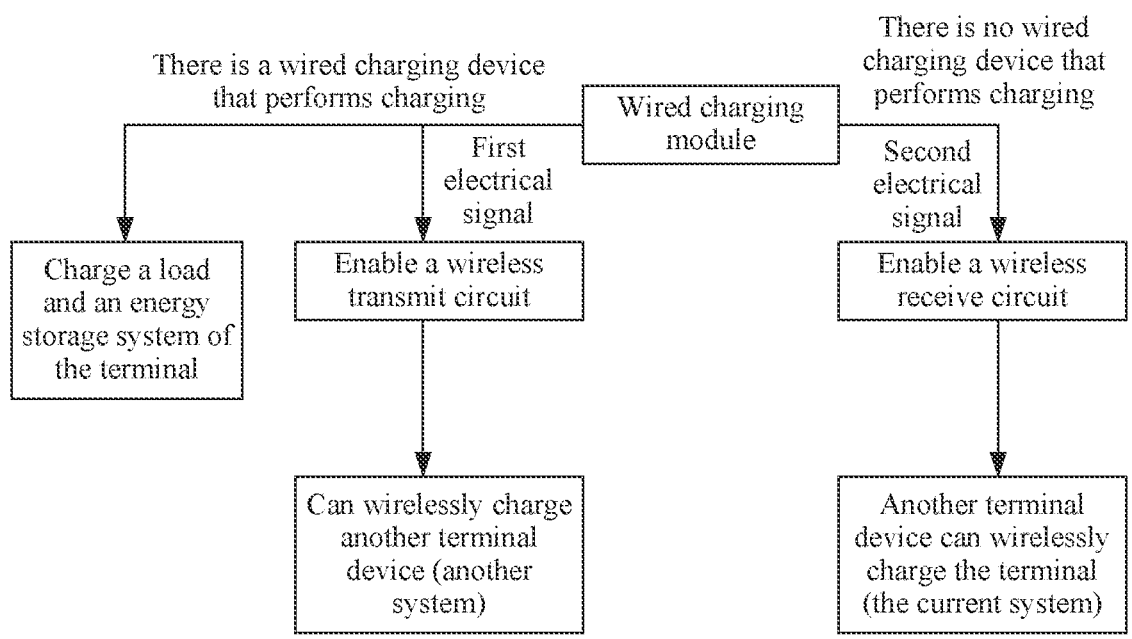
FIG. 2 is a logic diagram of a wireless charging system of a terminal according to an embodiment of the present disclosure.

For example, as shown in FIG. 2, when detecting that electric energy is input to the wired charging port 103, the detection module 104 sends a first electrical signal to the wireless charging module 102, to notify the wireless charging module 102 that a wired charging device is currently charging the terminal, and the wireless charging module 102 initiates the wireless charging transmitting circuit 1021 based on the first electrical signal. When detecting that no electric energy is input to the wired charging port 103, the detection module 104 sends a second electrical signal to the wireless charging module 102, to notify the wireless charging module 102 that no wired charging device is currently charging the terminal, and the wireless charging module 102 initiates the wireless charging receiving circuit 1022 based on the second electrical signal.

In this embodiment of the present disclosure, the wireless charging transmitting circuit 1021 and the wireless charging receiving circuit 1022 are integrated into a same terminal device, so that the terminal device can not only wirelessly charge another terminal device, but can also be wirelessly charged by another terminal. This reduces a quantity of devices, and it is convenient for a user to use and carry the terminal device. In addition, in the embodiments of the present disclosure, the wireless charging transmitting circuit 1021 is initiated only when a wired charging device charges the terminal device, in other words, can charge another terminal device. In this way, not only power of a terminal device used as a wireless charger can be ensured, but it can also be ensured that enough electric energy is input to another terminal device that is wirelessly charged.

Optionally, in this embodiment of the present disclosure, the wireless charging transmitting circuit 1021 is electrically connected to the wired charging port 103, and the wireless charging receiving circuit 1022 is electrically connected to a battery of the terminal.

In this embodiment of the present disclosure, as shown in FIG. 2, when it is detected that electric energy is input to the wired charging port 103, load in the terminal, an energy storage system (such as a battery system), and energy for wirelessly charging another terminal are all from a power supply connected to the wired charging port 103. In other words, when another terminal is being wirelessly charged, energy is transmitted by the wired charging port 103 to the wireless charging transmitting circuit 1021, and is not from the battery from the terminal. This can protect the battery of the terminal. When another terminal device wirelessly charges the terminal, energy is transmitted to the battery of the terminal through the wireless charging receiving circuit 1022.

Figure 3:
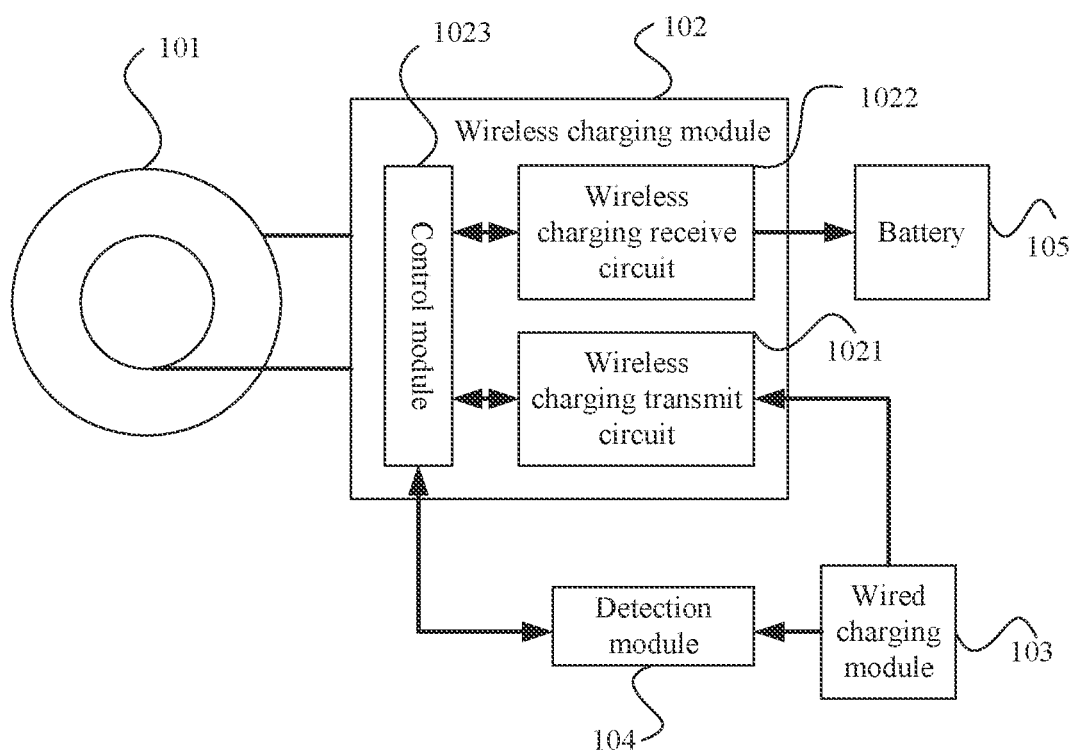
FIG. 3 is a schematic structural diagram 2 of a terminal according to an embodiment of the present disclosure.

Optionally, as shown in FIG. 3, the wireless charging module 102 further includes a control module 1023 electrically connected to the detection module 104. The wireless charging receiving circuit 1022 and the wireless charging transmitting circuit 1021 are electrically connected to the control module 1023.

The detection module 104 sends a first electrical signal to the control module 1023, and the control module 1023 initiates the wireless charging transmitting circuit 1021 based on the first electrical signal. The detection module 104 sends a second electrical signal to the control module 1023, and the control module 1023 initiates the wireless charging receiving circuit 1022 based on the second electrical signal.

Optionally, there is one coil 101.

In this embodiment of the present disclosure, one coil 101 is used by the terminal to wirelessly charge another terminal device, and used by the terminal to be wirelessly charged by another terminal device. In this way, components can be reduced, production costs can be reduced, and internal space of the terminal that is occupied by an electrical component can be reduced.

Figure 4:
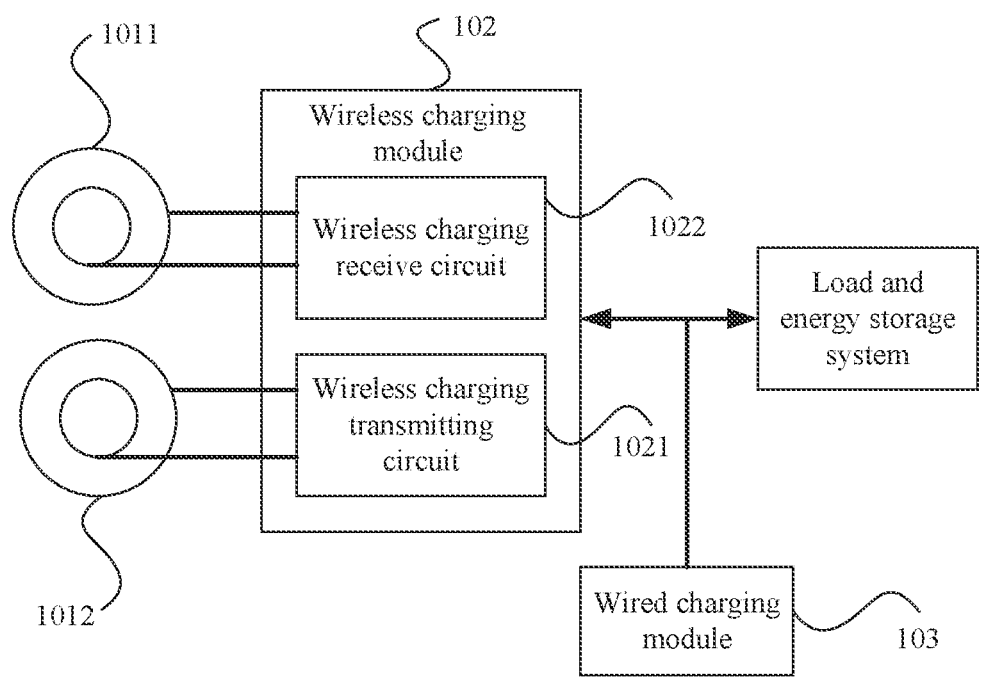
FIG. 4 is a schematic structural diagram 3 of a terminal according to an embodiment of the present disclosure.

Certainly, it may be understood that, there may alternatively be two coils 101. As shown in FIG. 4, when there are two coils 101, the two coils include a first coil 1011 electrically connected to the wireless charging transmitting circuit 1021 and a second coil 1012 electrically connected to the wireless charging receiving circuit 1022.

In conclusion, in this embodiment of the present disclosure, the wireless charging transmitting circuit 1021 and the wireless charging receiving circuit 1022 are integrated into a same terminal device, so that the terminal device can not only wirelessly charge another terminal device, but can also be wirelessly charged by another terminal. This reduces a quantity of devices, and it is convenient for a user to use and carry the terminal device. In addition, in the embodiments of the present disclosure, the wireless charging transmitting circuit 1021 is initiated only when a wired charging device charges the terminal device, in other words, can charge another terminal device. In this way, not only power of a terminal device used as a wireless charger can be ensured, but it can also be ensured that enough electric energy is input to another terminal device that is wirelessly charged.

According to another aspect of the embodiments of the present disclosure, a wireless charging control method is provided, and is applied to the foregoing terminal.

Figure 5:
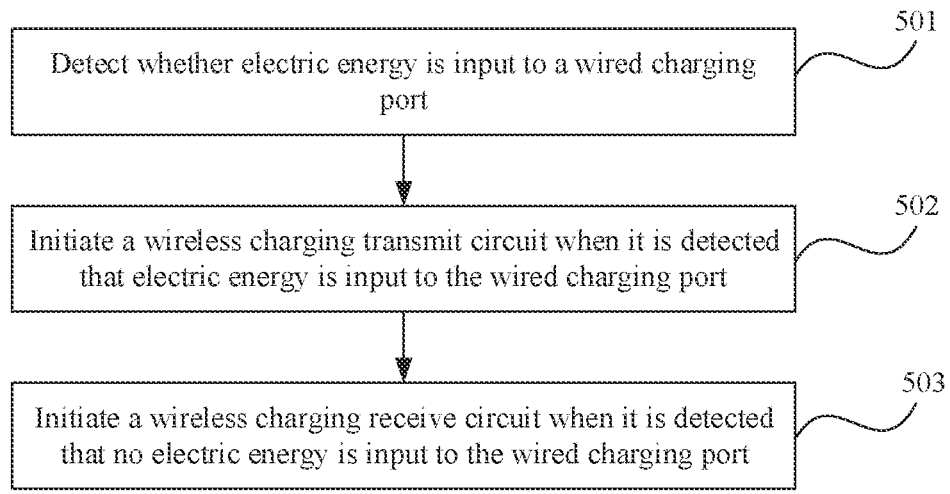
FIG. 5 is a schematic flowchart of a wireless charging control method according to an embodiment of the present disclosure.

As shown in FIG. 5, the wireless charging control method includes the following steps:

Step 501: Detect whether electric energy is input to the wired charging port.

In this step, it is detected whether there is a wired charging device (for example, a wired charger or a wired adaptor) that charges the terminal. For example, this may be detected by detecting a parameter such as a current or a voltage of the wired charging port.

Step 502: Initiate the wireless charging transmitting circuit when it is detected that electric energy is input to the wired charging port.

When electric energy is input to the wired charging port, it indicates that a wired charging device is charging the terminal, and the wireless charging transmitting circuit is initiated, so that the terminal is in a state of being capable of wirelessly charging another terminal device.

Step 503: Initiate the wireless charging receiving circuit when it is detected that no electric energy is input to the wired charging port.

When no electric energy is input to the wired charging port, it indicates that no wired charging device is charging the terminal, and the wireless charging receiving circuit is initiated, so that the terminal is in a state of being capable of being wirelessly charged by another terminal device.

In this embodiment of the present disclosure, the wireless charging transmitting circuit and the wireless charging receiving circuit are integrated into a same terminal device, so that the terminal device can not only wirelessly charge another terminal device, but can also be wirelessly charged by another terminal. This reduces a quantity of devices, and it is convenient for a user to use and carry the terminal device. In addition, in the embodiments of the present disclosure, the wireless charging transmitting circuit is initiated only when a wired charging device charges the terminal device, in other words, can charge another terminal device. In this way, not only power of a terminal device used as a wireless charger can be ensured, but it can also be ensured that enough electric energy is input to another terminal device that is wirelessly charged.

For example, after the wireless charging transmitting circuit is initiated, the method further includes:

when it is detected that the terminal wirelessly charges another terminal, controlling the electric energy input to the wired charging port, and transmitting the electric energy to the wireless charging transmitting circuit.

In this embodiment of the present disclosure, when another terminal is being wirelessly charged, energy is transmitted by the wired charging port to the wireless charging transmitting circuit, and is not from a battery from the terminal. This can protect the battery of the terminal.

In conclusion, in this embodiment of the present disclosure, the wireless charging transmitting circuit and the wireless charging receiving circuit are integrated into a same terminal device. This reduces a quantity of devices, and it is convenient for a user to use and carry the terminal device. In addition, in this embodiment of the present disclosure, another terminal device can be charged only when a wired charging device charges the terminal device. In this way, not only power of a terminal device used as a wireless charger can be ensured, but it can also be ensured that enough electric energy is input to another terminal device that is wirelessly charged.

According to another aspect of the embodiments of the present disclosure, a terminal is provided, and the terminal is the foregoing terminal.

Figure 6:
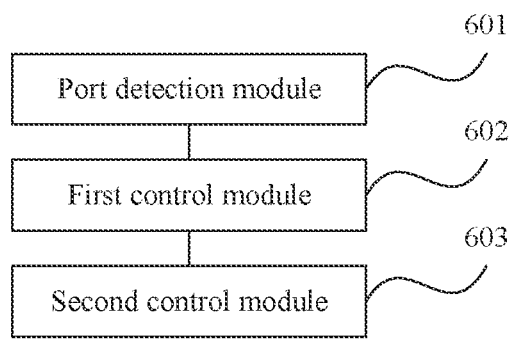
FIG. 6 is a schematic block diagram 1 of a terminal according to an embodiment of the present disclosure.

As shown in FIG. 6, the terminal further includes:
a port detection module 601, configured to detect whether electric energy is input to the wired charging port;
a first control module 602, configured to initiate the wireless charging transmitting circuit when the port detection module 601 detects that electric energy is input to the wired charging port; and
a second control module 603, configured to initiate the wireless charging receiving circuit when the port detection module 601 detects that no electric energy is input to the wired charging port.

For example, the terminal further includes:
a third control module, configured to after the wireless charging transmitting circuit is initiated, when it is detected that the terminal wirelessly charges another terminal, control the electric energy input to the wired charging port, and transmit the electric energy to the wireless charging transmitting circuit.

In this embodiment of the present disclosure, the wireless charging transmitting circuit and the wireless charging receiving circuit are integrated into a same terminal device. This reduces a quantity of devices, and it is convenient for a user to use and carry the terminal device. In addition, in this embodiment of the present disclosure, another terminal device can be charged only when a wired charging device charges the terminal device. In this way, not only power of a terminal device used as a wireless charger can be ensured, but it can also be ensured that enough electric energy is input to another terminal device that is wirelessly charged.

Figure 7:
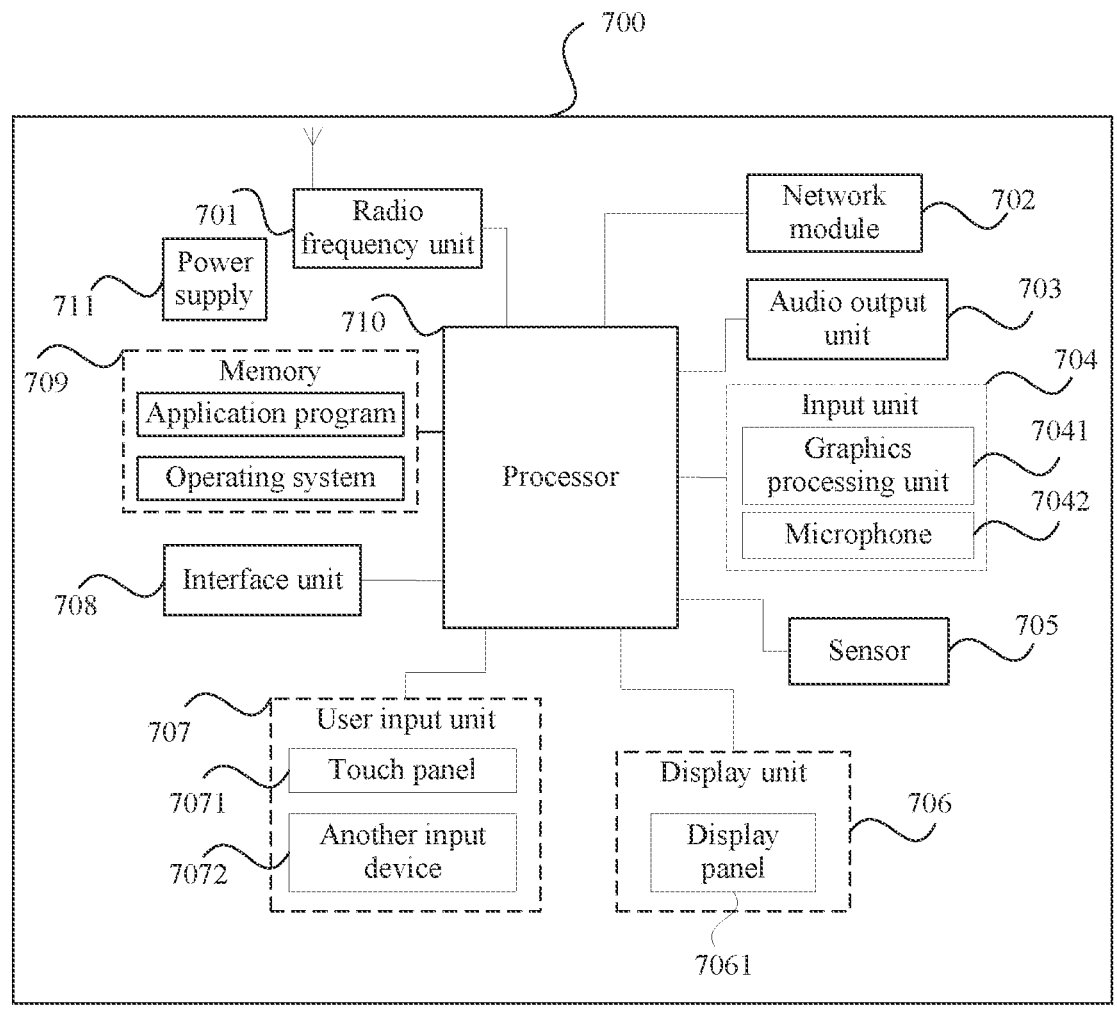
FIG. 7 is a schematic block diagram 2 of a terminal according to an embodiment of the present disclosure.

FIG. 7 is a schematic diagram of a hardware structure of a terminal according to embodiments of the present disclosure.

The terminal 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand that a structure of the terminal shown in FIG. 7 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, an in-vehicle terminal, a wearable device, a pedometer, and the like.

The processor 710 is configured to detect whether electric energy is input to the wired charging port: initiate the wireless charging transmitting circuit when it is detected that electric energy is input to the wired charging port; and initiate the wireless charging receiving circuit when it is detected that no electric energy is input to the wired charging port.

In this embodiment of the present disclosure, the wireless charging transmitting circuit and the wireless charging receiving circuit are integrated into a same terminal device. This reduces a quantity of devices, and it is convenient for a user to use and carry the terminal device. In addition, in this embodiment of the present disclosure, another terminal device can be charged only when a wired charging device charges the terminal device. In this way, not only power of a terminal device used as a wireless charger can be ensured, but it can also be ensured that enough electric energy is input to another terminal device that is wirelessly charged.

It should be understood that, in this embodiment of the present disclosure, the radio frequency unit 701 may be configured to receive and send information or receive and send a signal in a call process. For example, after downlink data from a base station is received, the processor 710 processes the downlink data. In addition, uplink data is sent to the base station. Generally, the radio frequency unit 701 includes but is not limited to an antenna, at least one amplifier, a transceiver, a coupler, a low noise amplifier, a duplexer, and the like. In addition, the radio frequency unit 701 may further communicate with a network and another device by using a wireless communication system.

The terminal provides wireless broadband Internet access for the user by using the network module 702, for example, helping the user send and receive an email, browse a web page, and access streaming media.

The audio output unit 703 may convert audio data received by the radio frequency unit 701 or the network module 702 or stored in the memory 709 into an audio signal and output as sound. In addition, the audio output unit 703 may further provide audio output (for example, call signal receiving sound or message receiving sound) related to a specific function performed by the terminal 700. The audio output unit 703 includes a loudspeaker, a buzzer, a telephone receiver, and the like.

The input unit 704 is configured to receive an audio or video signal. The input unit 704 may include a graphics processing unit (GPU) 7041 and a microphone 7042. The graphics processing unit 7041 processes image data of a static picture or a video obtained by an image capture apparatus (such as a camera) in a video capture mode or an image capture mode. A processed image frame may be displayed on the display unit 706. The image frame processed by the graphics processing unit 7041 may be stored in the memory 709 (or another storage medium) or sent by using the radio frequency unit 701 or the network module 702. The microphone 7042 may receive sound and can process such sound into audio data. The processed audio data may be output by being converted into a format that may be sent to a mobile communications base station by using the radio frequency unit 701 in a telephone call mode.

The terminal 700 further includes at least one sensor 705, such as an optical sensor, a motion sensor, and another sensor. For example, the optical sensor includes an ambient light sensor and a proximity sensor. The ambient light sensor may adjust luminance of the display panel 7061 based on brightness of ambient light, and the proximity sensor may disable the display panel 7061 and/or backlight when the terminal 700 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a terminal gesture (for example, horizontal and vertical screen switching, a related game, or magnetometer posture calibration), a function related to vibration recognition (for example, a pedometer or a strike), or the like. The sensor 705 may further include a fingerprint sensor, a pressure sensor, an iris sensor, a molecular sensor, a gyroscope, a barometer, a hygrometer, a thermometer, an infrared sensor, and the like. This is not described herein.

The display unit 706 is configured to display information entered by the user or information provided for the user. The display unit 706 may include the display panel 7061, and the display panel 7061 may be configured in a form of a liquid crystal display (LCD), an organic light-emitting diode (OLED), or the like.

The user input unit 707 may be configured to receive input digit or character information and generate key signal input related to user setting and function control of the terminal. For example, the user input unit 707 includes a touch panel 7071 and another input device 7072. The touch panel 7071, also referred to as a touchscreen, may collect a touch operation performed by the user on or near the touch panel 7071 (for example, an operation performed by the user on or near the touch panel 7071 by using any suitable object or accessory such as a finger or a stylus). The touch panel 7071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 710, and can receive and execute a command sent by the processor 710. In addition, the touch panel 7071 may be implemented by using multiple types such as a resistive type, a capacitive type, an infrared ray, and a surface acoustic wave. The user input unit 707 may include another input device 7072 in addition to the touch panel 7071. For example, the another input device 7072 may include but is not limited to one or more of a physical keyboard, a function key (such as a volume control key or an on/off key), a trackball, a mouse, a joystick, and the like. Details are not described herein.

Optionally, the touch panel 7071 may cover the display panel 7061. After detecting the touch operation on or near the touch panel 7071, the touch panel 7071 transmits the touch operation to the processor 710 to determine a type of a touch event, and then the processor 710 provides corresponding visual output on the display panel 7061 based on the type of the touch event. In FIG. 7, the touch panel 7071 and the display panel 7061 are used as two independent components to implement input and output functions of the terminal. However, in some embodiments, the touch panel 7071 and the display panel 7061 may be integrated to implement the input and output functions of the terminal. This is not specifically limited herein.

The interface unit 708 is an interface connecting an external apparatus to the terminal 700. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 708 may be configured to receive input (for example, data information and power) from the external apparatus and transmit the received input to one or more elements in the terminal 700, or may be configured to transmit data between the terminal 700 and the external apparatus.

The memory 709 may be configured to store a software program and various data. The memory 709 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 709 may include a high-speed random access memory, and may further include a non-volatile memory such as at least one magnetic disk storage component, a flash memory component, or another volatile solid-state storage component.

The processor 710 is a control center of the terminal, and is connected to all parts of the entire terminal by using various interfaces and lines, and performs various functions of the terminal and processes data by running or executing the software program and/or the module that are stored in the memory 709 and invoking the data stored in the memory 709, to implement overall monitoring on the terminal. The processor 710 may include one or more processing units. Optionally, the processor 710 may be integrated with an application processor and a modem processor. The application processor mainly processes an operating system, a user interface, an application program, and the like, and the modem processor mainly processes wireless communication. It may be understood that the modem processor may also not be integrated into the processor 710.

The terminal 700 may further include the power supply 711 (such as a battery) that supplies power to each component. Optionally, the power supply 711 may be logically connected to the processor 710 by using a power management system, to implement functions such as charging, discharging, and power consumption management by using the power management system.

In addition, the terminal 700 includes some function modules not shown, and details are not described herein.

Optionally, an embodiment of the present disclosure further provides a terminal, including a processor 710, a memory 709, and a computer program that is stored in the memory 709 and that can run on the processor 710. When the computer program is executed by the processor 710, each process of the embodiments of the foregoing wireless charging control method can be implemented, and a same technical effect can be achieved. To avoid repetition, details are not described herein.

An embodiment of the present disclosure further provides a non-transitory computer-readable storage medium. A computer program is stored in the non-transitory computer-readable storage medium. When being executed by a processor, processes of the embodiments of the foregoing wireless charging control method can be implemented, and a same technical effect can be achieved. To avoid repetition, details are not described herein. The non-transitory computer-readable storage medium includes a read-only memory (ROM), a random access memory (RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing implementations, a person skilled in the art may clearly understand that the foregoing method embodiments may be implemented by using software and a required universal hardware platform, and certainly may be implemented by using hardware. However, in many cases, the former is a better implementation. Based on such an understanding, the technical solutions of the present disclosure essentially or the part contributing to related technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described with reference to the accompanying drawings above. However, the present disclosure is not limited to the foregoing specific implementations. The foregoing specific implementations are merely exemplary, but are not limiting. A person of ordinary skill in the art may make many forms without departing from the objective and the scope of the claims of the present disclosure.

What is claimed is:

1. A terminal, comprising:
a coil disposed inside the terminal;
a wireless charging module electrically connected to the coil, wherein the wireless charging module comprises a wireless charging transmitting circuit and a wireless charging receiving circuit that are electrically connected to the coil; and
a detection module that is electrically connected to the wireless charging module and a wired charging port of the terminal; wherein
when detecting that electric energy is input to the wired charging port, the detection module sends a first electrical signal to the wireless charging module, and the wireless charging module initiates the wireless charging transmitting circuit based on the first electrical signal; and when detecting that no electric energy is input to the wired charging port, the detection module sends a second electrical signal to the wireless charging module, and the wireless charging module initiates the wireless charging receiving circuit based on the second electrical signal.

2. The terminal according to claim 1, wherein the wireless charging module further comprises a control module electrically connected to the detection module, and the wireless charging receiving circuit and the wireless charging transmitting circuit are electrically connected to the control module; and
the detection module sends the first electrical signal to the control module, and the control module initiates the wireless charging transmitting circuit based on the first electrical signal; and the detection module sends the second electrical signal to the control module, and the control module initiates the wireless charging receiving circuit based on the second electrical signal.

3. The terminal according to claim 1, wherein the wireless charging transmitting circuit is electrically connected to the wired charging port, and the wireless charging receiving circuit is electrically connected to a battery of the terminal.

4. The terminal according to claim 1, wherein there is one coil.

5. The terminal according to claim 1, wherein there are two coils, comprising a first coil electrically connected to the wireless charging transmitting circuit and a second coil electrically connected to the wireless charging receiving circuit.

6. A wireless charging control method, wherein the method is applied to a terminal, the terminal comprises a coil disposed inside the terminal, a wireless charging module and a detection module; the wireless charging module comprises a wireless charging transmitting circuit and a wireless charging receiving circuit that are electrically connected to the coil; the detection module is electrically connected to the wireless charging module and a wired charging port of the terminal, and the method comprises:
- detecting whether electric energy is input to the wired charging port;
- initiating the wireless charging transmitting circuit when it is detected that electric energy is input to the wired charging port; and
- initiating the wireless charging receiving circuit when it is detected that no electric energy is input to the wired charging port.

7. The method according to claim 6, wherein after the wireless charging transmitting circuit is initiated, the method further comprises:
- when it is detected that the terminal wirelessly charges another terminal, controlling the electric energy input to the wired charging port, and transmitting the electric energy to the wireless charging transmitting circuit.

8. A non-transitory computer-readable storage medium, wherein the non-transitory computer-readable storage medium stores a computer program, and the computer program, when executed by a processor, causes the processor to perform:
- detecting whether electric energy is input to the wired charging port;
- initiating the wireless charging transmitting circuit when it is detected that electric energy is input to the wired charging port; and
- initiating the wireless charging receiving circuit when it is detected that no electric energy is input to the wired charging port.

9. The non-transitory computer-readable storage medium according to claim 8, wherein the computer program, when executed by a processor, causes the processor to further perform:
- when it is detected that the terminal wirelessly charges another terminal, controlling the electric energy input to the wired charging port, and transmitting the electric energy to the wireless charging transmitting circuit.

\* \* \* \* \*